Feb. 2, 1971   J. A. MERRITT   3,559,236
APPARATUS FOR MOLDING PLASTIC
Original Filed Sept. 1, 1967   2 Sheets-Sheet 2
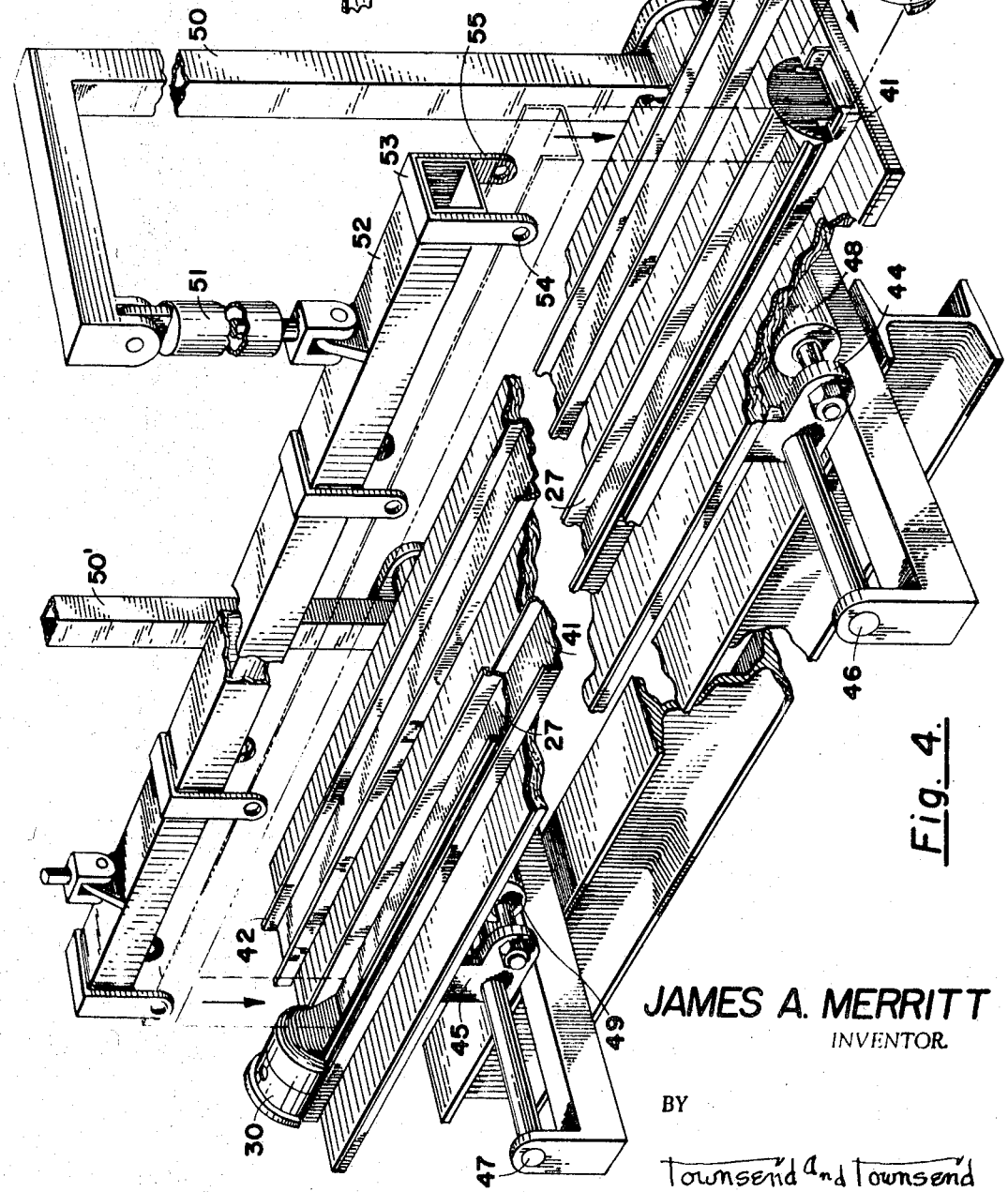
JAMES A. MERRITT
INVENTOR.
BY
Townsend and Townsend
ATTORNEYS United States Patent Office 3,559,236
Patented Feb. 2, 1971

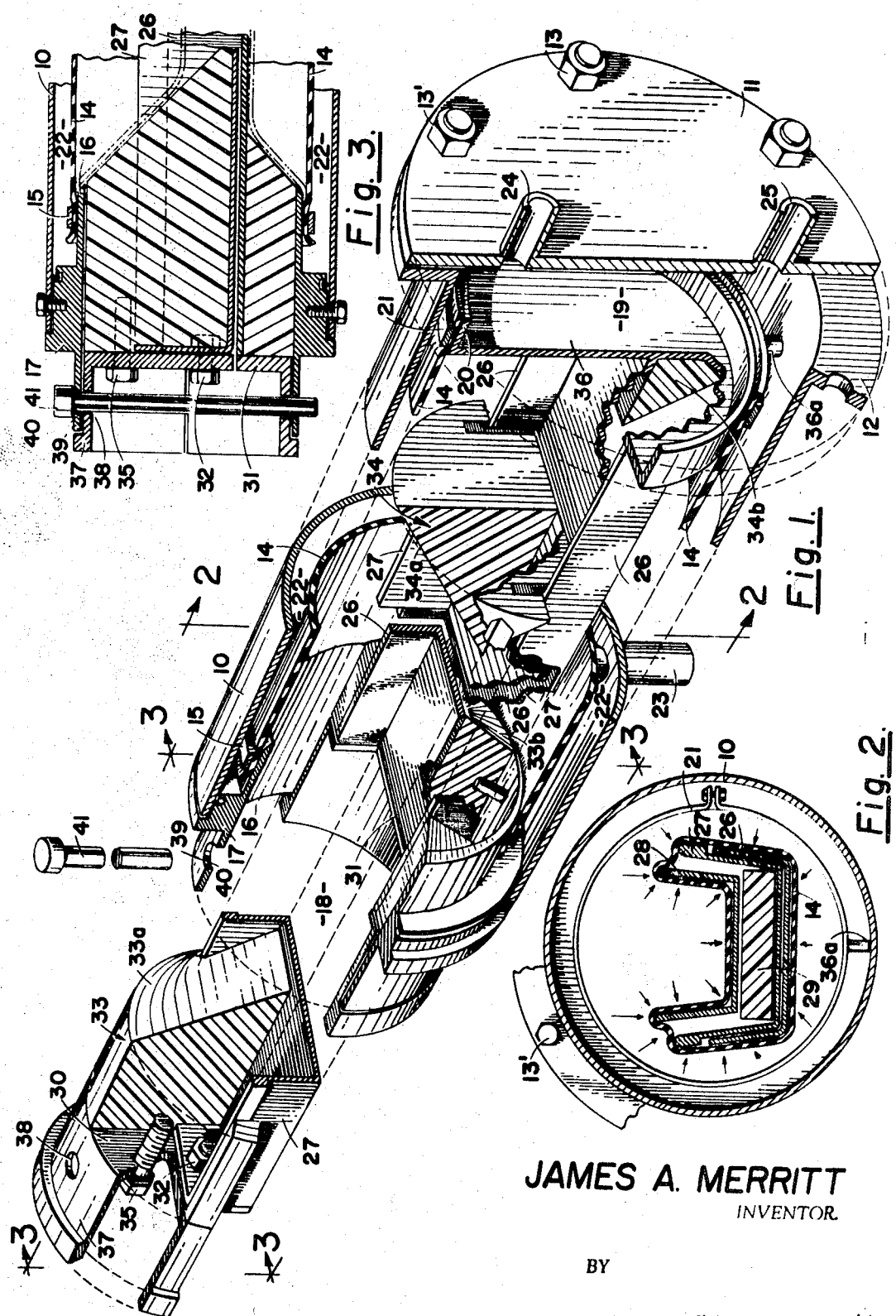

3,559,236
APPARATUS FOR MOLDING PLASTIC
James A. Merritt, Livermore, Calif., assignors to Glass Reinforced Engineered Materials, Inc., Haywood, Calif.
Continuation of application Ser. No. 665,055, Sept. 1, 1967. This application Dec. 2, 1969, Ser. No. 876,178
Int. Cl. B30b 5/02, 11/32
U.S. Cl. 18—5
10 Claims

ABSTRACT OF THE DISCLOSURE

Plastic molding apparatus of an autoclave type having a hot gas or steam deformable inner liner which conforms to a light-weight, two-part mold containing curable plastic. The introduction of steam conforms the liner to the exerior of the mold and provides heat and pressure to cure the plastic.

---

This invention relates to apparatus for molding plastic. In a specific embodiment, the invention provides an autoclave type unit adapted for the rapid molding of variously shaped articles in relatively rapid succession while utilizing light weight inexpensive molds.

This application is a continuation of copending application S.N. 665,055, filed Sept. 1, 1967, and now abandoned.

To date, molding of articles from plastic has been accomplished generally in one of two ways. For commercial purposes where speed and volume were paramount, molds have been formed from relatively heavy, strong materials such as steel so as to withstand high heat and pressure. The high heat and pressure serves to keep production time to a minimum. The disadvantage of this technique is that the molds are expensive both in terms of the materials required for their construction and in terms of the skilled labor which goes into making them up. Consequently, the cost of the end product must be relatively high or the operation is not practical from a commercial standpoint.

Techniques utilizing light weight molds which do not supply the structural properties themselves for withstanding the molding condition have been utilized. In general, where these light weight molds have been used an autoclave was employed. The light weight mold is placed inside a flexible bag, the bag sealed, and the bag in turn placed in the autoclave. Steam provided by the autoclave surrounds the bag on all sides and thereby provides counterbalancing forces on all sides of the mold. It thus permits the use of relatively light weight molds. The disadvantage of this technique is that the cycle to produce one article, i.e., loading, heating, cooling, unloading, etc., is time consuming and production rates have not been possible which would meet commercial demands.

The present invention provides apparatus which takes advantage of the autoclave principle of utilizing the steam or other hot gas or hot fluid as a way of balancing forces so that the mold itself need not provide the structural properties necessary to withstand the forces occurring during molding. At the same time, the new apparatus of this invention has been designed so that high production rates are possible, making the lamination of parts economically feasible which were not attempted before due to the high cost of conventional mold fabrication. With the apparatus of the present invention it is possible to use light weight match-molds of extruded aluminum, for example, to produce a laminated article of any desired shape.

In a preferred embodiment the apparatus takes the form of a rigid tube having one open end. A fluid (gas or liquid) impervious flexible lining is sealed with respect to the interior of the tube adjacent the ends thereof to define a steam receiving space between the tube and lining. An inlet for steam communicates with the steam receiving space. The open end of the rigid tube includes a closure plug that can be removed for inserting and withdrawing materials to be molded interiorly of the flexible lining. The apparatus further includes contoured inserts interiorly of the lining adjacent the closure plug and the opposite end of the tube designed for preventing rupture of the lining when the lining is collapsed by steam introduced into the steam receiving space during a molding operation. In the absence of these inserts the lining might be subjected to undue stresses at the point of its seal with the interior of the tube.

Other preferred aspects of the apparatus include conduits for cooling water to the steam receiving space for cooling the apparatus and molded article following a molding cycle. This permits rapid removal of the molded article and insertion of new material to be molded. Another preferred structure is an external guide such as a track in line with the removable closure plug. This permits opening of the closure plug, rapid sliding of the molded article and mold out of the tube on the rail, and rapid insertion of a new mold for repetition of the cycle. All of these aspects and others are designed to enable the present unit to achieve high production rates so that it is economically feasible to manufacture all types of laminated articles with light weight low cost molds.

With reference to the accompanying drawings, FIG. 1 shows in perspective the molding tube utilized in the preferred embodiment with parts broken away.

FIG. 2 is an end section taken along the line 2—2 of FIG. 1 showing a match mold in place in the tube during the commencement of a molding operation and illustrating the position of the flexible lining as it is forced into contact with the mold by steam.

FIG. 3 is an end section taken along the line 3—3 of FIG. 1 showing the details of the closure plug when attached to the tube as well as the mounting of the flexible lining to the interior of the tube.

FIG. 4 is a perspective view illustrating one embodiment for a loading and unloading station to be used in conjunction with the molding tube of FIGS. 1-3.

FIG. 5 is an end section illustrating the position of the mold separating parts of the station of FIG. 4 during opening of a mold.

More specifically with respect to the drawings, the preferred embodiment includes at tube 10 having a plate 11 fixed to flange 12 on one end thereof by a plurality of nuts and bolts such as 13 and 13'. A flexible fluid impervious lining 14 is attached interiorly at each end of tube 10.

Lining 14 may be made from rubber, plastic or similar material. The type of material selected is not critical so long as it has the necessary flexibility to conform under steam pressure to the molds inserted in the tube. At the same time the lining should be fluid impervious so that the steam is retained in the appropriate chamber as will be described hereinafter.

To this end, lining 14 is secured in sealed relation with respect to the interior of tube 10 by means of a clamping ring 15 disopsed around shelf 16 which extends interiorly of tube 10 from mouth 17 of open end 18. Lining 14 rests on shelf 16 and is secured thereto by ring 15 as best illustrated in FIG. 3. Lining 14 is similarly sealed with respect to tube 10 at closed end 19 of tube 10. Thus, lining 14 rests on lip 20 and is clamped thereto by ring 21.

With this structure a steam receiving space 22 is thereby defined between lining 14 and the interior walls of tube 10. Steam is introduced into sapce 22 from conduit 23 from a source of steam (not shown). Also communicating with space 22 is a water inlet conduit 24 and a water and steam outlet conduit 25. By attaching conduit 24 to a source of cold water and flowing the water therethrough, a rapid cooling of the interior of tube 10 together with the mold and molded article which may be present therein can be achieved following the input of steam.

On the interior of lining 14, a U-shaped track or channel 26 is disposed running the length of tube 10. Channel 26 serves as a supporting guide for molds as they are inserted interiorly of lining 14. Channel 26 is not essential to the operation of the unit and molds could be inserted interiorly of lining 14 to rest directly thereon. Other alternatives are possible. For example, a Teflon lined perforated plate could be inserted in the position of channel 26 upon which molds could be slid and supported preparatory to molding. The Teflon surface has the advantage of preventing excessive wear on the interior surfaces of the lining 14 from the sliding in and out of molds. Direct placement of the mold on lining 14, or with a Teflon surface interposed as noted, has the advantage of permitting more rapid heat transfer from the steam through the lining and to the mold than where channel 26 is utilized.

In the preferred embodiment a U-shaped pair of channels is illustrated as one type of light weight match mold assembly that may be utilized. The bottom half of the mold is channel 27. Channel 27 is designed to slide interiorly of channel 26 for insertion within lining 14. A matching inner channel 28 fits within channel 27. A charge of material to be molded such as glass fiber reinforced polyester together with suitable catalyst, filler, and the like schematically illustrated at 29 is inserted between matching channels 27 and 28 preparatory to insertion of channel 27 within channel 26. FIG. 2 particularly illustrates the realtionship of parts, with the matched channels 27 and 28 and plastic charge 29 therebetween, following insertion within tubes 10 and 14 at the commencement of a molding cycle. Insertion and withdrawal of channel 27 and associated parts is facilitated by attachment of channel 27 to closure plug assembly 30 to be described hereinafter.

Open end 18 of tube 10 is covered in part by a normally fixed closure 31 disposed across the lower half of tube 10. Channel 26 meets fixed closure member 31 at the forward or open end 18 of tube 10. The top part of open end 18 is covered by removable plug or closure 30. Channel 27, which may be utilized as the bottom half of a mold, extends outwardly from plug 30 and is attached thereto by nuts and bolts such as 32. As can be seen in FIG. 1 and particularly in FIG. 4, when removable closure plug 30 is withdrawn from tube 10, channel 27 together with other materials which may be within channel 27, are withdrawn entirely from tube 10 for purposes of loading and unloading.

During use of the device when steam is introduced into space 22 flexible lining 14 is collapsed and conforms to the exterior surfaces of the mold that has been inserted interiorly of lining 14. See FIG. 2 illustrating the position of lining 14 after it has been collapsed under the forces of steam or other gas or liquid under pressure in sapce 22. Since lining 14 is attached relative the interior surface of tube 10 at the two ends of the tube, lining 14 cannot be collapsed at the points of attachment. Considerable stresses are thereby placed upon lining 14 at the areas of attachment when the steam under pressure is introduced into space 22.

To prevent rupture of the lining when reatlively high pressures are developed in space 22 which exceed the unsupported structural properties of lining 14, it is preferable to utilize contoured inserts such as insert 33 at the open end 18 of tube 10 and insert 34 at the closed end 19 of tube 10. Inserts 33 and 34 taper gradually downwardly from the ends of tube 10 toward the center thereof. During input of steam lining 14 rests upon the contoured inserts and thereby collapses only insofar as the degree of taper or slope thereof permits. The gradual contour of the inserts prevents any sharp collapse of lining 14 in the vicinity of the points of its attachment and thereby eliminates risk of rupture. In the preferred embodiment the design is such that at no point does the lining 14 have to span an area where it is not supported except when the span is small (e.g., ¼" or ½") and the strength of the lining is sufficient to resist bursting due to the gas or fluid pressure.

Insert 33 is made in two parts with a top half 33a and a bottom half 33b. Top half 33a of insert 33 is suitably attached such as by bolts 35 to the inside face of closure plug 30. Bottom half 33b of insert 33 is permanently fixed on the inside of fixed closure 31. Thus, the two parts of inserts 33 generally lie along the line at which removable plug 30 meets fixed closure member 31 when plug 30 is inserted within tube 10. It is advisable to minimize the gap along the part line between insert parts 34a and 34b to avoid rupture of lining 14.

A similar arrangement exists with respect to insert 34, with top half 34a of insert 34 being fixed to channel 27 and removable therewith, whereas bottom half 34b of insert 34 is fixed interiorly of lining 14. Insert 34 could of course be made so that it is not parted at all and remains in fixed position by securing it to plate 36 at end 19 of tube 10. Plate 36 serves to close fluid communication between the interior of lining 14 and space 22 at tube end 19. Plate 36 is suitably supported by column 36a at the lower side. Lip 20, described earlier in connection with clamp 21, extends from the edge of plate 36 and is a part thereof.

Closure plug 30 is suitably designed with a forwardly extending flanged area 37 having a hole 38 therethrough. Mouth 17 of tube 10 is formed with a forwardly extending cooperating flanged area 39 and hole 40. Closure plug 30 may be easily locked in place when in place with bolt 41 inserted through holes 38 and 40 as best illustrated in FIG. 3. This structure serves to retain closure plug 30 and associated parts in position within tube 10 during molding and resists opening under pressures generated when steam is introduced in space 22. At this time air within lining 14 is forced rapidly outwardly and in the absence of bolt 41 might cause closure plug 30 to be thrown out of tube 10.

Loading and unloading of tube 10 may be rapidly accomplished by sliding closure plug 30 in and out thereof. Preferably a guide such as a track is aligned in front of closure plug 30 so that closure plug 30 along with channel 27 and associated parts of the mold can be even more rapidly moved to a desired location. In the preferred embodiment the guide takes the form of a track or rails such as rails 41 illustrated in FIG. 4. With rails 41 in the position shown plug 30 together with channel 27 and matching channel 28 can be rapidly moved in and out of tube 10 without time and effort lost for alignment.

Even more speed is achieved by utilizing a plurality of pairs of parallel rails. Thus rails 42 can be added to lie parallel to rails 41. By providing a mechanism for shifting a rail out of the position in line with tube 10 after removal of a molded part thereon, another available rail can be moved into position and tube 10 filled for the next cycle while at the same time unloading is accomplished from the rail that has just received an article from tube 10.

A laterally moving loading and unloading station such as table top 43 may be utilized which contains a plurality of parallel rails 41 and 42 attached thereto. Lateral shifting of table 43 can be accomplished by any suitable means. In FIG. 4 one mechanism is illustrated. Table 43 is mounted on supporting arms 44 and 45. Arm 44 rides on rod 46 while arm 45 rides on rod 47. A pair of hydraulic rams 48, 49 cause arms 44 and 45 respectively to be laterally moved in unison on rods 46 and 47 when the rams 48 and 49 are actuated.

It may also be desirable to provide means for disengaging the two parts of a match mold either because they are too hot to manually handle or because they are adhered together by the material that has been molded. For such a purpose an overhead crane type assembly, as illustrated in FIG. 4, can be utilized. As shown, this may take the form of supporting columns and arms 50 and 50′ having depending therefrom hydraulic rams such as ram 51.

A horizontal beam 52 is depended from the rams such as ram 51. Beam 52 supports a plurality of inverted U brackets such as bracket 53 having holes 54, 55 through the lower end thereof. As shown in FIG. 5, the unit is operated by lowering horizontal beam 52 downwardly so that holes 54 and 55 of U bracket 53 are adjacent to the top of the mold lying in one of the tracks such as track 41. Where the top half of the mold illustrated in dotted lines in FIG. 5 has correspondingly placed holes relative to holes 54 and 55 of U bracket 53, a bolt such as 56 may be inserted therethrough. When the rams such as ram 51 are actuated to lift beam 52, the top half of the mold on track 42 is raised and separated from the bottom half permitting ready removal of the molded article and insertion of new material to be molded.

Although the foregoing invention has been described in some detail by way of illustration and example for purposes of clarity of understanding, it is understood that certain changes and modifications may be practiced within the spirit of the invention as limited only by the scope of the appended claims.

What is claimed is:

1. Apparatus for molding plastic comprising: a molding chamber having rigid walls and a flexible fluid impervious lining disposed about the internal perimeter of said walls, said lining being sealed with respect to selected parts of said walls so as to form a fluid tight area between the lining and the walls, said fluid tight area extending about the internal perimeter of the molding chamber, a mold adapted for receiving resin to be molded insertable interiorly and spaced from said flexible lining, said mold including at least two thin-walled nesting mold parts fitted together in loose relation to form a space therebetween, and means for deforming said lining to conform with the exterior of said mold and seal the space between said mold parts against plastic outflow, said means for deforming said lining including a source of fluid in communication with said fluid tight area for introduction of fluid therein, said fluid being under sufficient pressure and having a temparature to mold resin contained in said mold.

2. Apparatus for molding plastic comprising: a molding chamber having rigid walls and a flexible fluid impervious lining disposed about the internal perimeter of said walls, said lining being sealed with respect to selected parts of said walls so as to form a fluid tight area between the lining and the walls, said fluid tight area extending about the internal perimeter of the molding chamber, a mold adapted for receiving resin to be molded insertable interiorly of said flexible lining, said mold comprising matching mold parts of similar shape, one of said mold parts having at least a portion of its outer portions trough-shaped, said mold having at least said trough-shaped outer surface of said mold part spaced from the liner when the liner is not deformed, and means for deforming said lining to conform with the exterior of said mold including said trough-shaped surface when said mold is interiorly of said lining, said means for deforming said lining including a source of fluid in communication with said fluid tight area for introduction of fluid therein, said fluid being under sufficient temperature and pressure to mold resin contained in said mold.

3. Apparatus in accordance with claim 2 wherein said mold is a light weight matching mold and said source of fluid is a source of steam.

4. Apparatus for molding plastic comprising: a rigid tube having one open end, a fluid and gas impervious flexible lining sealed with respect to the interior of said tube adjacent the ends thereof to define a steam receiving space between the tube and lining, steam inlet means communicating with said steam receiving space, a removable closure plug for said open end of the tube, and contoured inserts disposed interiorly of said lining adjacent said closure plug and the opposite end of the tube adapted to prevent rupture of said lining during input of steam into said steam receiving space.

5. Apparatus in accordance with claim 4 wherein said contoured inserts taper gradually downwardly from the ends of the tube towards the middle of the tube.

6. Apparatus for molding plastic comprising: a rigid tube having one open end, a fluid and gas impervious flexible lining sealed with respect to the interior of said tube adjacent the ends thereof to define a steam receiving space between the tube and lining, steam inlet means communicating with said steam receiving space, a closure plug for said open end including at least part of a contoured insert attached to the interior face of the plug adapted for preventing rupture of said lining during a molding operation, said closure plug being removable from said tube together with the insert attached thereto, said plug also having an elongate member extending outwardly therefrom of a preselected configuration and adapted for use as part of a match-mold assembly, said elongate member being removable from the interior of said lining and tube along with said closure plug.

7. Apparatus in accordance with claim 6 wherein said closure plug covers a portion of the open end of said tube, the remainder of the open end being covered by a fixed closure member, said removable closure plug being withdrawable together with the elongate extension for loading and unloading of the tube, said contoured insert being parted along a line parallel to the line where the removable closure plug meets the fixed closure member so that the part of the insert adjacent the removable plug is withdrawable therewith.

8. Apparatus for molding plastic comprising: a rigid tube having one open end, a fluid and gas impervious flexible lining sealed with respect to the interior of said tube adjacent the ends thereof to define a steam receiving space between the tube and lining, steam inlet means in communication with said steam receiving space, a removable closure plug for said open end, means interiorly of said tube for preventing rupture of the flexible lining during collapse of the lining from forces produced by steam, and an external guide in line with said removable closure plug for the rapid movement of molds into and out of said tube when the closure plug is removed.

9. Apparatus in accordance with claim 8 and including means for circulating cooling fluid through said steam receiving space at preselected intervals.

10. Apparatus in accordance with claim 8 wherein said external guide comprises an external loading and unloading station having a plurality of pairs of parallel rails, means to laterally shift a selected pair of rails in line with the removable closure plug on said tube, and means adjacent to said rails to lift part of a mold out of contact with the remainder thereof which is on the rails following removal of the mold from the tube.

References Cited

UNITED STATES PATENTS

| | | |
|---|---|---|
| 2,937,421 | 5/1960 | Taccone. |
| 3,034,191 | 5/1962 | Schaefer et al. |
| 3,091,804 | 6/1963 | Gerard et al. |
| 3,172,153 | 3/1965 | Loomis et al. |
| 3,241,188 | 3/1966 | Febbo et al. |
| 3,103,699 | 9/1963 | Gerard et al. |
| 3,118,177 | 1/1964 | Von Platen. |
| 3,038,203 | 6/1962 | Gross. |

J. HOWARD FLINT, Jr., Primary Examiner